Oct. 21, 1947.  O. E. BATORI  2,429,212

SLIDE RULE

Filed Nov. 23, 1945

O. E. Batori
INVENTOR.

Patented Oct. 21, 1947

2,429,212

UNITED STATES PATENT OFFICE 2,429,212

SLIDE RULE

Oscar E. Batori, New York, N. Y.

Application November 23, 1945, Serial No. 630,221

2 Claims. (Cl. 235—84)

This invention relates to computing devices of the slide rule type, in which logarithmic scales are arranged on relatively movable members to perform computations mechanically. One type of slide rule is embodied in circular form and includes two or more concentric discs, relatively movable with respect to each other, with logarithmic scales thereon and having an indicator arm to facilitate the use and co-action of the scales. Another type of slide rule is the straight slide rule, which consists of a fixed base and a movable slide, which latter reciprocates with respect to the base and with scales placed on both members. A third type slide rule is cylindrical and consists of an axially rotated cylinder and a rotary and axially movable slide, with co-acting longitudinal scales.

Whatever the type or mechanical arrangement of a slide rule may be, the logarithmic scales placed thereon make it a computing device, and determine the character and spirit of the slide rule. Without scales the slide rule is a meaningless device.

The history of the slide rule shows, that first the different logarithmic scales, as are the numerical, trigonometric and exponential scales, have been successively invented. Later methods have been invented, how to apply the scales according to known laws and to solve trigonometric and exponential problems. Further, later new methods were invented to simplify and to shorten the solutions.

In numerous important and frequently occurring trigonometric problems, however, the solutions with prior slide rules are indirect and too complicated. They introduce auxiliary elements in the solution or require the recording of intermediate results. In many cases the determination of the position of the decimal point in the number is necessary, which is a disadvantage of slide rule computations and also the source of errors in such operations. Furthermore, slide rule methods have been developed, using the two faces of the slide rule, with the disadvantage of the two side operations.

It is an important object of this invention to provide for new and better slide rule methods for the solution of important spherical and plane triangle problems, in which the solution is direct, without use of auxiliary elements, and is continuous, without recording the intermediate resultants.

Another important object of this invention is to eliminate in important solutions the mental determination of the position of the decimal point in the numbers, and to make it mechanically by the scales themselves.

A further object of this invention is to provide new solutions which involve the one side of the slide rule only instead of the two sides of it.

The invention also resides in the selection and disposition of scales on the relatively movable parts, irrespective of the type of the slide rule.

These and other objects of the invention and the means for their attainment will be hereinafter more fully described and one embodiment of it, by which the invention may be realized, illustrated in drawing, and particularly pointed out in the appended claims.

Figure 2:
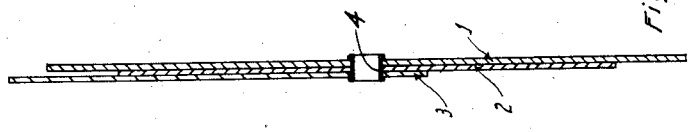
Figure 2 is a sectional view of it.

In the one embodiment of this invention shown in the drawing, it consists of a circular base member 1; a circular side member 2, in front of and of smaller diameter than the base member and concentric with the base member; an indicator arm 3, of any usual construction, with a radial indicator line 5 in it, in front of the slide member and rotatable about the center of the base and slide members; an appropriate pivot 4, connecting the beforesaid three members and for free and independent rotation about a common center.

On the front face of the slide rule, on base member 1, the outermost scale is designated as "Hav." and is a haversine scale, with divisions to represent angles from 1°1′ to 180°. Haversine, it will be understood, is the notation of the expression $$\frac{1-\cosine A}{2}$$

for angle A. This range of angles on scale hav. will give natural haversines in connection with scales C and D, which are yet to be described.

Immediately below the hav. scale is a scale designated as S(C), which is a sine (cosine) scale, with divisions to represent angles for sine, from 30″ to 90° and for cosine from 89°59′30″ to 0°. The numerals representing the angles for sine are shown free, for cosine in parenthesis. These two scales of sine and (cosine) are to be read in opposite directions.

The range of angles will give sines (cosines) in connection with scales C and D, from 0.0001 to 1.0.

Immediately below scale S(C) is a scale designated as C, which is a numerical scale with a range from 0.0001 to 1.0.

Figure 1:
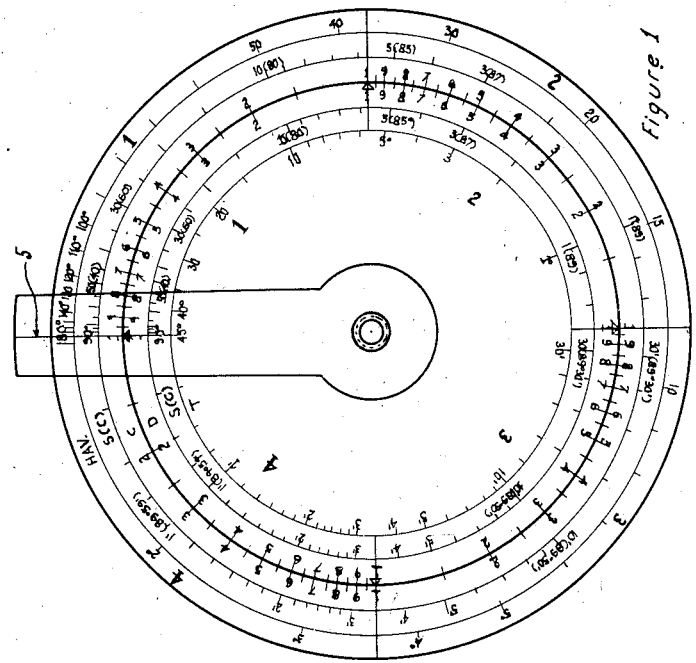
Figure 1 is a plane view showing the face of the slide rule.

The outermost scale on slide 2 is a scale designated as D, which is a numerical scale and is identical with scale C on base member 1 described hereinbefore. Immediately below scale D is a scale designated as S(C), which is for sines and (cosines) and will be noted as inner sine (cosine) scale. It is identical with the sine (cosine) scale on base member 1, which will be noted as outer sine (cosine) scale. On the drawing in Figure 1 both sine (cosine) scales are labeled the same: S(C). Immediately below the inner scale S(C) on the slide member is a scale designated as T, which is a tangent scale, with divisions to represent angles for tangent from 30" to 45°. This range of angles will give tangents in connection with scales C and D from 0.0001 to 1.0.

The scales described hereinbefore are logarithmic, in the one embodiment shown in the drawing circular, concentric, and consist of four logarithmic unit lengths or four quadrants, with respect to the circular form. Each unit length or quadrant of the scales is designated by a numeral. The first unit length is designated by the numeral 1 and is for values from 0.1 to 1.0; the second by numeral 2 and is for values from 0.01 to 0.1; the third by numeral 3 and is for values from 0.01 to 0.001; the fourth by numeral 4 and is for values from 0.001 to 0.0001.

The designation of the quadrants (logarithmic unit lengths) by numerals as described above is also indicative of the position of the figures in the numbers in relation to the decimal point. In this respect the designation 1 in the first quadrant indicates, that in this quadrant the first figure in a number has the first place to the right of the decimal point; the designation 2 in the second quadrant indicates that in this quadrant the first figure in a number has the second place from the decimal point, and so on.

This designation is applied in relation to the numerical evaluation of trigonometric (angular) values. The corresponding numerical values of the haversine, sine (cosine) or tangent can readily be found in connection with scales C or D, and with the indication of the position of the decimal point. For example, 50° in the haversine scale is in the first quadrant, its natural haversine is in the first quadrant of scale C and thus it will be 0.1786, with the first figure having the first place from the decimal point. 1°10' in the haversine scale can be found evaluated in the fourth quadrant of scale C, and will be 0.0001, the first figure having the fourth place from the decimal point. Using C and D numerical scales independent of the trigonometric scales, the designation described before may be applied for computations with numbers larger than 1. In this case, designation 1 means that the respective number consists of one figure to the left of the decimal point; designation 2 means that the respective number consists of two figures to the left of the decimal point, and so on.

By the designation of the scales as described before the intermediate resultants and final results are expressed in absolute numerical values mechanically—eliminating the mental determination of absolute values of numbers, an important feature of this invention.

Figure 3:
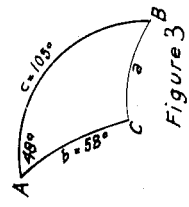
Figure 3 shows a spherical triangle illustrative of the new solution of this slide rule for such triangle.

By the selection, disposition, and designation of the scales described before, new methods are created by this invention for the spherical and plane triangle problems, as it will be described and demonstrated in typical related illustrative examples and will also be compared with prior slide rule methods, in the following:

Figure 3 illustrates the spherical triangle in which two sides $(b, c)$ and the included angle $(A)$ are given, the third side $(a)$ and the two angles $(B, C)$ being required. One solution of such problems is based on the known cosine-haversine formula, which states that:

$$\text{hav. } a = \text{sine } b \times \text{sine } c \times \text{hav. } A + \text{hav. } (c-b)$$

For the solution of this equation the haversine scale (hav.), the inner sine scale (S(C)), the numerical scale D, are applied.

Illustrative Example 1:

It is related to a spherical triangle problem, the triangle shown in Figure 3.

Given:
$b=58°$, $c=105°$ (75°), $A=48°$, and $c-b=47°$.

Required:
$a=65°40'$; $B=43°30'$; $C=128°20'$.

Solution:
Set indicator to 48° (A) on hav. scale.
Index of scale D to indicator.
Indicator to 58° (b) on scale S (inner).
Index of scale D to indicator.
Indicator to 75° (c) on scale S (inner).
Read at indicator on scale C.
Natural haversine 0.13517, 1st quadrant, equivalent to the first part of the right side of the formula given above.
Set 47° (c-b) on hav. scale and by indicator read natural haversine on scale C=0.159 1st quadrant.
Add the two natural haversines:
0.13517+0.159=0.29417 1st quadrant
Opposite 0.29417 1st quadrant on scale C read on scale hav. 65°40'=angle A.

In this solution three scales are used: the hav., the sine (inner), and the numerical scale C. The natural haversine is indicated in its absolute value, from which the corresponding angle is found directly without mental determination of the position of the decimal point.

Referring again to Figure 3, to find the angles B and C, the sine formula is applied, which states that:

$$\text{sine } B = \frac{\text{sine } A}{\text{sine } a} \times \text{sine } b; \quad \text{sine } A = \frac{\text{sine } A}{\text{sine } a} \times \text{sine } C$$

Given: (for B) $b=58°$, $a=65°40'$, $A=48°$.
Required: B (angle).
Solution:
Set sine 48° (A) on scale S (outer) and sine 65°40' (a) on scale S (inner) in alignment, opposite sine 58° (b) on scale S (inner) read B=43°30' on scale S (outer).

In this problem only sines (angles) are involved, in the form of a fraction and a multiplier. The solution is direct, without auxiliary methods, rapid, and the result is expressed in sine (angle). With prior slide rules these solutions shown in Example 1 above are not available.

Figure 4:
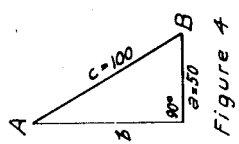
Figure 4 shows a right triangle illustrative of the solution for such triangles by this invention.

Illustrative Example 2 and Figure 4 relate to a right triangle problem.

Given: The side $a=50$, hypotenuse $c=100$,
$$\text{sine } A = \frac{a}{c} = \frac{50}{100}$$

Solution: $b = \cos A \times c$, in which $\cos A$ is not known.

For the solution the above formula is converted into:
$$b = \frac{\text{sine } A}{\text{tang } A} \times c, \text{ in which sine } A \text{ is known.}$$

Set 50 (a) on scale C, in alignment with 100 (c) on scale D.
Indicator to index of D.
Read at indicator on outer sine scale A=30°.
Set 30° on scale T to indicator.
Read at index of scale D on scale C, b=86.

In this solution instead of cos A, which is unknown, the equivalent fraction of
$$\frac{\text{sine } A}{\text{tang } A}$$
is used and set directly in proportion on the sine and tangent scales. The operation is continuous, without recording intermediate resultants and consists of five steps, counting in the setting of the indicator arm each time it is set.

The solution of the same problem by prior slide rule method will be described hereafter.

Figure 5:
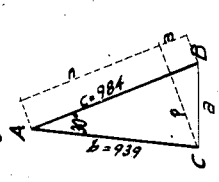
Figure 5 shows an oblique triangle illustrative of the solution of such triangles by this invention.

Another basic problem in plane trigonometry is the triangle problem shown in Figure 5, in which two sides and the included angle are given. The prior slide rule solution of this problem is indirect and complicated, involving the breaking of the problem in two, as will be shown hereafter. The new solution created by this invention is direct, simple, and rapid—and satisfies a long-standing necessity for such solution.

Figure 5 illustrates an oblique triangle, related to illustrative Example 3.

Illustrative Example 3:

Given:
Side $b=939$, side $c=984$.
Included angle $A=30°$.
Sum of the two other angles
$$B+C = 180° - 30° = 150°$$

Required: The two other angles of the triangle (B, C) and the third side $a=500$.

Solution:
Set 939 (b) on scale C in alignment with 984 (c) on scale D.
Find by inspection on outer and inner sine scales two angles opposite, the sum of which is 150°. These are:
70° on outer scale S=B, and 80° on inner S scale=C, the sum of which is 150°.

For the solution of the third unknown side "a," the sine formula is applied, converted in this form:
$$a = \frac{\text{sine } A}{\text{sine } B} \times b$$
which involves a fraction of two sines (angles) and a numerical factor $b$. The solution is direct by the proportion setting of the two sines on the two adjacent sine scales.

Solution:
Set 30° (A) on outer S scale in alignment with 70° (B) on inner scale S.
Opposite 939 on scale D, read 500=a on scale C.

The procedure for the unknown two angles and one side of the triangle involves altogether six steps, counting in the setting of the indicator arm each time it is set.

The advantage of this invention for trigonometric solutions will be more clearly evident by demonstrating the solutions of a prior slide rule for the same problem. For this purpose the slide rule shown in United States Patent 2,170,144 is selected, as the most advanced type of slide rule at present.

Said patent cannot solve illustrative Example 1 by the cosine-haversine method, having no haversine scale thereon.

Illustrative Example 2:

Solution by said patent:
Set indicator to 50 (a) on scale D.
Index of scale S to indicator.
Indicator to 100 (c) on scale D, read: 30° on scale S at indicator.
Record 30° for later use.
Set indicator to 100 (c) on scale D.
Index of scale cosine to indicator.
Indicator to 30° on cosine scale, read: 86=b on scale D at indicator.

The solution consists of two phases and six steps. The two phases are separated and the solution loses continuity of operation and requires the recording of an intermediate resultant.

The same problem is solved by this invention directly, in five steps, instead of six, and in continuous operation, without intermediate recording as described hereinbefore.

Illustrative Example 3, solved by said patent:
Solution:
Set indicator to 939 (b) on scale D.
Index of scale S to indicator.
Indicator to 30° on scale S, read:
469.5 (p) on scale D at indicator.
Record: p=469.5 for further use.
Set indicator to 60° on scale S, read:
813 (n) on scale D at indicator.
Subtract: $c-n = 984-813 = 171 = m$.
Set indicator to 469.5 (p) on scale D.
Index of scale T to indicator.
Indicator to 171 (m) on scale D, read:
70° on scale T at indicator.
Record: Angle B=70°.
Set indicator to 469.5 on scale D.
70° on scale S to indicator.
Indicator to index of scale S, read:
$a=500$ on scale D at indicator.

This solution involves the introduction of two right triangles, the auxiliary elements of $p$, $m$ and $n$, the solution is not continuous and requires ten steps, two recordings, and one subtraction.

The same problem solved by this invention is direct, without auxiliary elements, continuous, without recording, and short—made in six steps, as shown hereinbefore.

I claim:
1. A slide rule comprising a base member having a logarithmic haversine scale, a logarithmic sine (cosine) scale and a standard logarithmic numerical scale thereon; a slide member, relatively movable to the base member, having a standard logarithmic numerical scale and a logarithmic sine (cosine) scale thereon; said scales on the base and slide members consisting of four logarithmic unit lengths, each unit length marked by limiting lines at its start and end and designated by a numeral, indicative of the position of the figures in the number in relation to the decimal point in it.

2. A slide rule having two relatively movable members; one of the two members having a logarithmic haversine scale, a logarithmic sine (cosine) scale and a standard logarithmic numerical scale thereon; the other member having a standard logarithmic numerical scale, a logarithmic sine (cosine) scale, the two latter scales identical to similar scales of the first said member and a logarithmic tangent scale thereon; said scales on the base and slide members consisting of four logarithmic unit lengths, each unit length marked by limiting lines at its start and end and designated by a numeral, indicative of the position of the figures in the number in relation to the decimal point in it.

OSCAR E. BATORI.

REFERENCES CITED

The following references are of record in the file of this patent:

UNITED STATES PATENTS

| Number | Name | Date |
|---|---|---|
| 922,465 | Fenn | May 25, 1909 |